Nov. 10, 1953 — G. A. BRACE — 2,658,443
ELECTRIC TOASTER
Filed Dec. 20, 1947 — 3 Sheets-Sheet 1

INVENTOR.
George A. Brace
BY Harry S. Dumars
ATTORNEY.

Nov. 10, 1953  G. A. BRACE  2,658,443
ELECTRIC TOASTER

Filed Dec. 20, 1947  3 Sheets-Sheet 2

INVENTOR.
George A. Brace
BY
Harry S. Demaree
ATTORNEY.

Nov. 10, 1953  G. A. BRACE  2,658,443
ELECTRIC TOASTER

Filed Dec. 20, 1947  3 Sheets-Sheet 3

INVENTOR.
George A. Brace
BY
Harry S. Dumarsh
ATTORNEY.

Patented Nov. 10, 1953

2,658,443

UNITED STATES PATENT OFFICE 2,658,443

ELECTRIC TOASTER

George A. Brace, Highland Park, Ill., assignor to The Hoover Company, North Canton, Ohio, a corporation of Ohio Application December 20, 1947, Serial No. 793,011

5 Claims. (Cl. 99—329)

1

This invention relates to toasters and more particularly to a timing mechanism for timing successive toasting operations whereby toast may be prepared uniformly and in accordance with the operator's desires.

More particularly this invention relates to thermal timers for toasters of the heat-up type in which the toasting intervals are timed by the time it takes for a thermally responsive element to heat to a predetermined temperature and move to a hot position to terminate the toasting interval.

Timers of the heat-up type must be cooled after each toasting operation to condition the thermally responsive element so that it can properly time a succeeding toasting interval. If a succeeding toasting operation is not begun immediately after a previous one the thermally responsive element will cool naturally so as to be properly conditioned for timing a following toasting operation. However, if a second toasting operation is initiated immediately after a previous one the thermally responsive element will only be partially cooled. Hence, the carriage is released too soon and before the bread has become toasted.

According to this invention a cooling block is automatically moved into contact with the thermally responsive element at the termination of each toasting operation to quickly cool the thermally responsive element thereby making it possible to initiate another toasting operation immediately.

According to this invention the thermally responsive element is forcibly moved from its hot position at the termination of each toasting interval. This will tend to straighten the thermally responsive element and bring it into good thermal contact with the cooling block and cool it so that the bread carriers may be returned immediately to toasting position and latched in that position.

Thermal timers for toasters of the heat-up type have an inherent tendency to over-compensate. That is, to operate too fast in timing toasting operations after the first so that toast is progressively underdone for each succeeding toasting operation after the first. As a toaster is operated in rapid succession to perform succeeding toasting operations it acquires more and more residual heat. This heat, added to that produced by the heaters will toast bread faster and faster as the residual heat accumulates with repeated use. However, timers of the heat-up type also accumulate heat and become progressively hotter for each succeeding toasting operation. It has

2 been found that the tendency of the heat-up timers is to time too fast with rapid repeated use so that the toast is progressively underdone. The cooling block of the present invention serves to minimize this tendency.

According to another feature of this invention a compensating thermally responsive element is positioned to be responsive to the heat accumulated in the toasting oven so that as the toasting oven heats up with repeated use the compensating thermally responsive element will apply increasing resistance to movement of the thermal timer and lengthen the toasting intervals sufficiently to overcome the tendency of thermal timers to over-compensate. It will of course be understood that each toasting interval after the first will be progressively shorter as residual heat is accumulated but the compensating thermally responsive element will lengthen the toasting intervals after the first sufficiently to overcome the tendency of the thermal timer to act too fast. This will render it possible to toast bread to the same degree whether it is the first, second, or fourth toasting operation initiated in rapid succession.

According to another feature of this invention an easily manipulatable dial is positioned at the front of the toaster for moving the toast carriers upwardly for inspection of the toast independently of the timing mechanism. Also according to this invention a dual purpose push button is positioned centrally in a recess in the dial for reciprocatory and rotary movement. Inward movement of the push button closes a switch to energize a solenoid to move the bread carriers to toasting position. Rotary movement of the push button operates in a novel manner to adjust the timer for preparing light, medium, or dark toast.

According to another feature of this invention a thermal timer is provided having a portion movable to a hot, carriage releasing position against a manually adjustable spring bias. By varying the spring bias, the timer can be readily and simply adjusted to make dark, medium, or light toast. A feature of the spring bias arrangement is its location between the timing and compensating thermostats in such manner as to be effective on both of these elements.

Other objects and advantages of this invention will become apparent as the description proceeds when taken in connection with the accompanying drawings in which.

Figure 1:
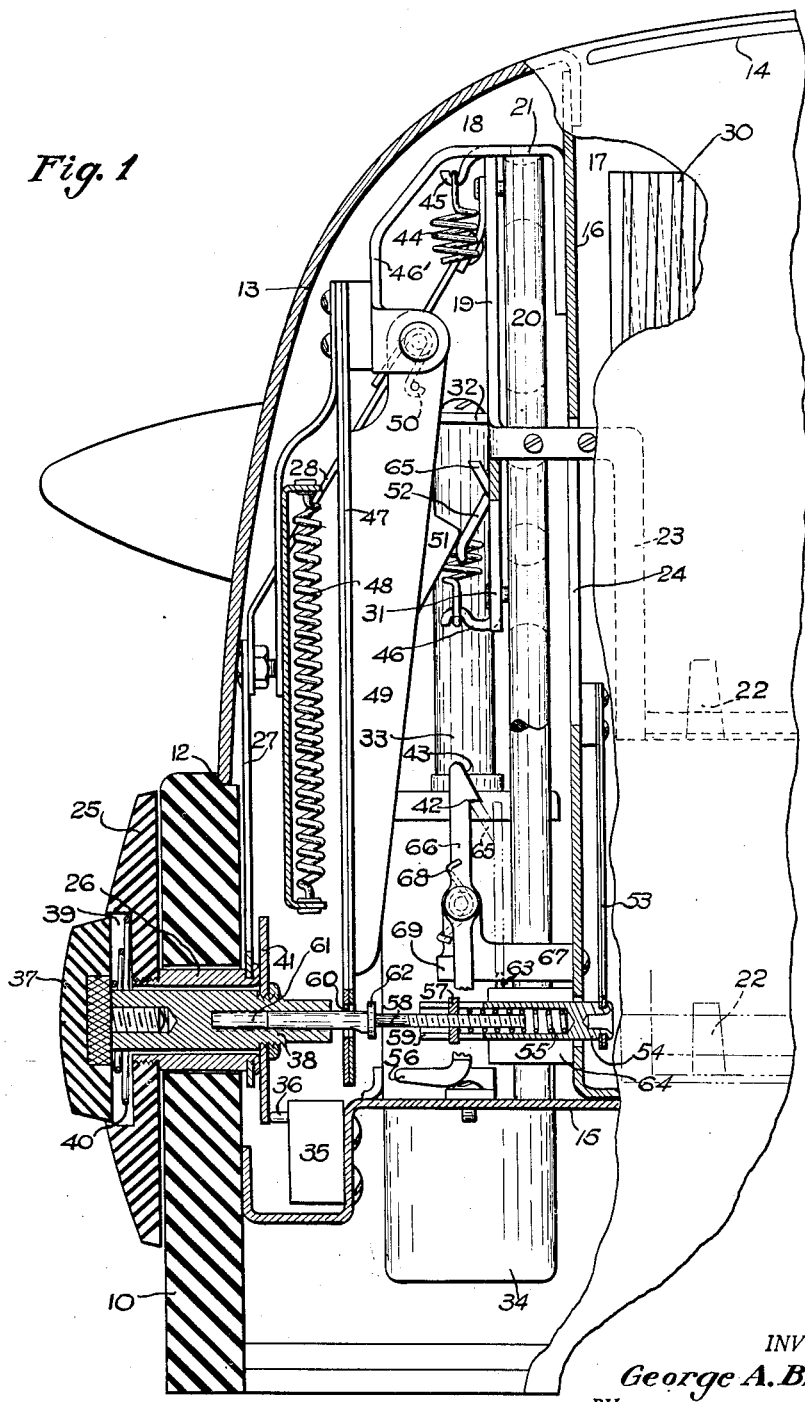
Figure 1 is a vertical plan view of the front end of the side of a toaster according to this invention with the walls of the toaster broken away to show the details of construction.

Referring to the drawings the reference numeral 10 represents the base of the toaster which may be made of any suitable insulating heat resisting material such as hard rubber, a phenolic condensation product or other such heat resisting insulating material. The front end of the base 10 has an upstanding arcuate protuberance 11 for a purpose which will appear hereinafter.

Mounted on a peripheral ledge 12 of base 10 is an appearance housing 13 having bread receiving slots 14 in its top. Supported on the base 10 inwardly of the ledge 12 is a supporting plate 15 which supports the entire mechanism of the toaster housed within the appearance housing 13. A partition 16 divides the interior of the appearance housing 13 into a toasting oven 17 and a mechanism compartment 18.

A carriage plate 19 is mounted for vertical reciprocation on a pair of guide rods 20 rigidly attached at their lower ends to a supporting plate 15 and attached at their upper ends to the partition 16 by a bracket 21. Bread carriers 22 are supported by the carriage plate 19 by arms 23 extending rearwardly and downwardly through vertical slots 24 in the partition 16 to provide for the vertical reciprocation of the carriers 22, as will later appear.

The carriage plate 19 is adapted to be manually moved upwardly for toast inspection purposes by a manually actuatable dial 25 positioned exteriorly of the base 10 and rotatably mounted in the protuberance 11 of the base 10 by means of a hollow shaft 26. Rigidly secured to the inner end of the hollow shaft 26 is a crank arm 27, the outer end of which is pivotally attached to a link 28 which extends diagonally rearwardly through the mechanism compartment 18 and is pivotally attached at its upper end 29 to the carriage plate 19. The direction of rotation of the dial 25 for moving the carriers 22 upwardly for inspection purposes is indicated by the arrow on the face of the dial 25 and preferably by the legend "Inspect." Main heating elements 30 for performing the toasting function are positioned on each side of each of the bread carriers 22.

The carriage plate 19 normally rests, by gravity, on an auxiliary carriage plate 31 also mounted for vertical reciprocation on the guide rods 20. Extending upwardly and laterally from the upper edge of the auxiliary carriage plate 31 are a pair of arms 32 rigidly secured to the upper ends of solenoid plungers 33 adapted to be drawn downwardly by solenoid coils 34 mounted on the supporting plate 15. The solenoid coils 34 are adapted to be energized by a normally open switch 35 which is closed by the depression of the plunger 36.

A push button 37 is attached to a plunger 38 mounted for rotation and reciprocation inside the hollow shaft 26. The push button 37 fits within a recess 39 centrally of the dial 25 and is spring-biased to the left as viewed in Fig. 1 by the spring 40. The inner end of plunger 38 carries a plate 41 adapted to contact the plunger 36 of the switch 35 to close the switch 35 as will be explained hereinafter.

Figure 4:
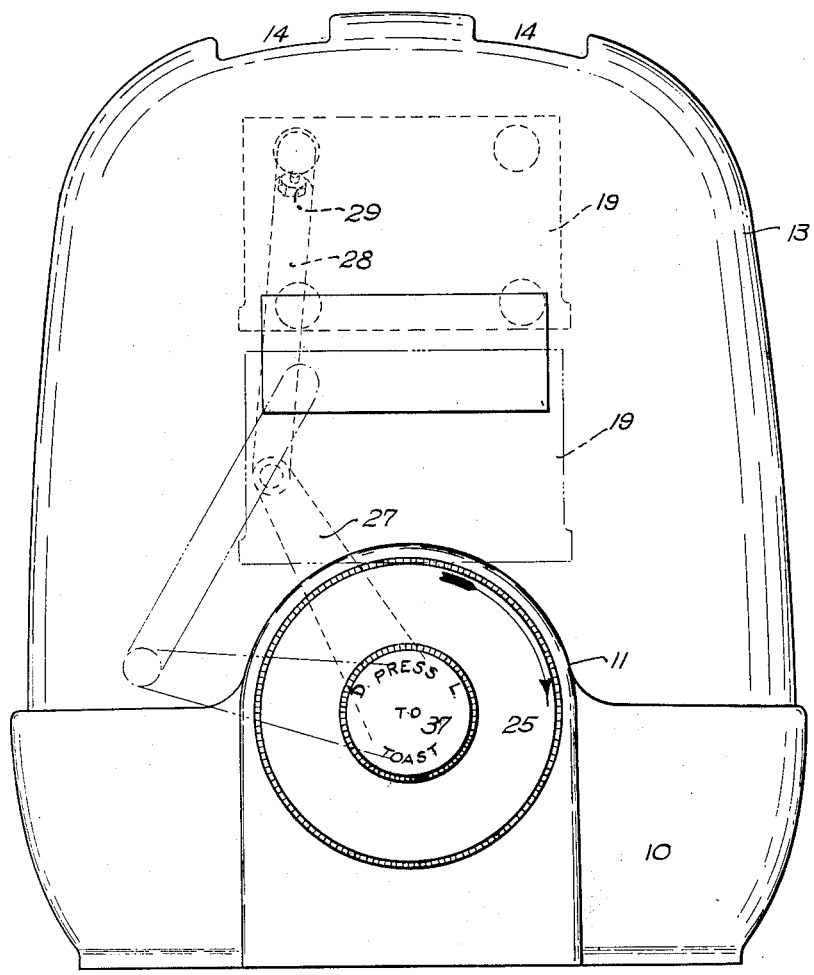
Figure 4 is a view showing how the bread carriers are moved upwardly for inspection purposes.

As shown in Fig. 4, the face of the button 37 carries the directive indicia "Press to Toast" advising the user how to initiate a toasting operation.

Struck forwardly from the upper edge of auxiliary carriage plate 31 is a lug 65 which cooperates with latch lever 66 to hold the auxiliary carriage 31 in downward position. The latch lever is pivoted to the bracket 67 extending forwardly from partition 16. Latch 66 is biased clockwise as viewed in Fig. 1 by a spring 68 against a stop 69 on the bracket 67. The latch lever 66 has a hook 42 and a cam 43 overlying the hook 42 for a purpose which will be explained hereinafter. The tail end 56 of the latch 66 lies immediately back of the lower end of the bimetallic timer 47.

The auxiliary carriage plate 31 is biased for upward movement by a spring 44 anchored at its upper end to a hook 45 extending forwardly from the bracket 21 and at its lower end is attached to carriage plate 31 by means of a hook 46 extending forwardly from the carriage plate 31.

Extending forwardly and downwardly from the bracket 21 is an extension 46' which supports the upper end of a bimetallic timer 47 and an auxiliary heater 48 positioned forwardly of the bimetallic timer 47.

It will be understood that heater 48 can be mounted on the outer face of bimetal 47. Pivoted to lugs on the lower end of the extension 46' is a cooling block 49 which is biased counterclockwise by a spring 50. A cam 51 on cooling block 49 cooperates with a cam 52 struck forwardly from the auxiliary carriage plate 31 in a manner to be explained later.

Figure 3:
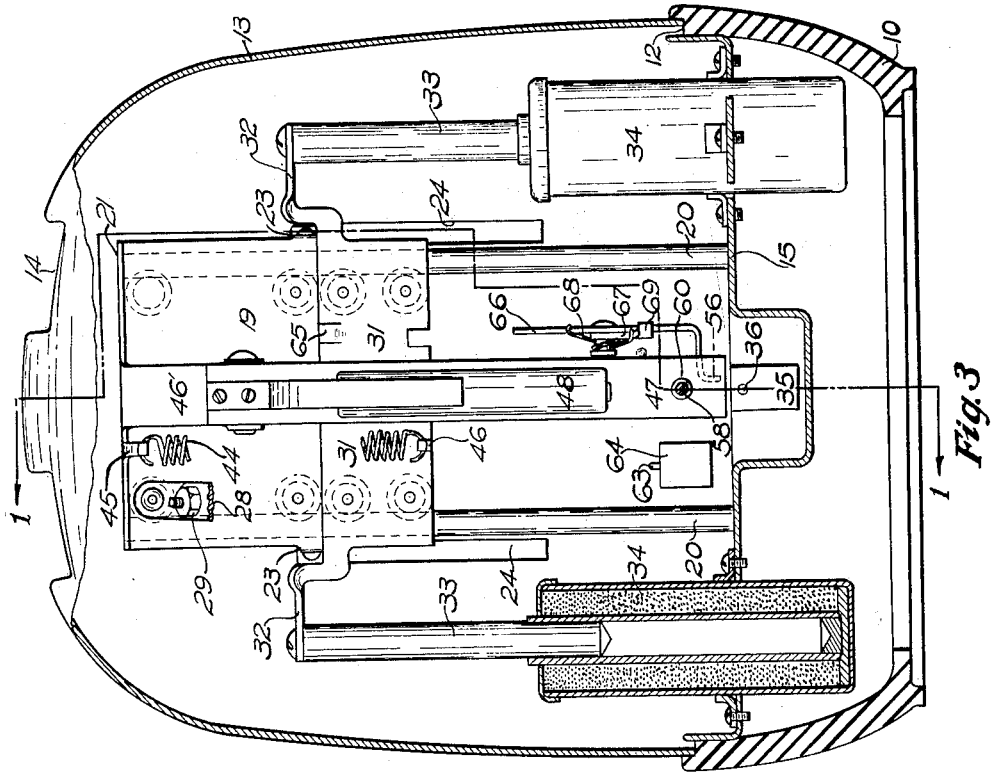
Figure 3 is a front plan view.
Figure 2:
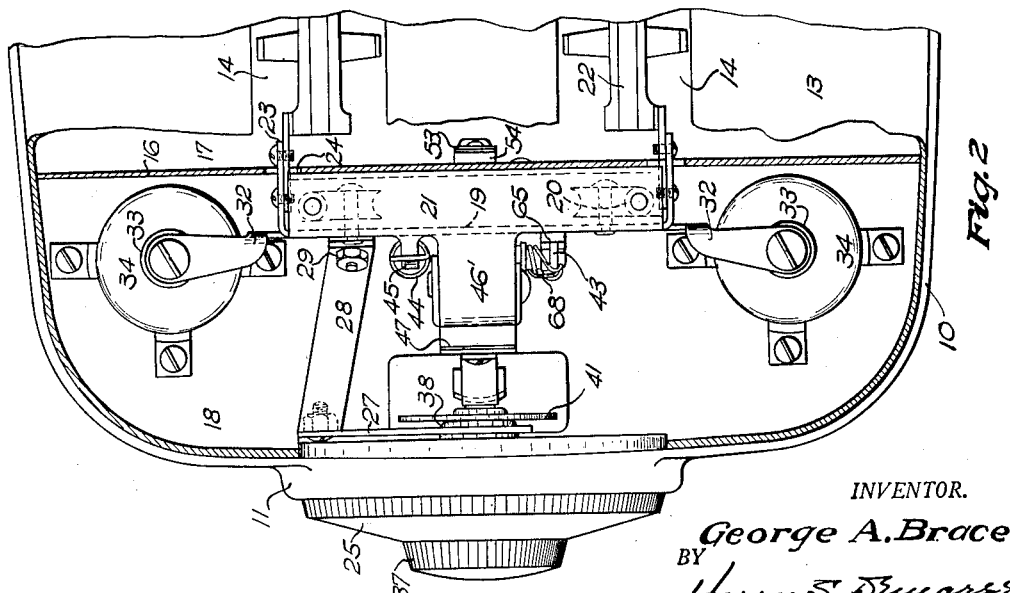
Figure 2 is a top plan view of the front end of the toaster of this invention with the walls of the toaster broken away.

Attached to the partition 16 inside the toasting oven 17 is a compensating bimetal 53 which carries at its lower end a slotted cylinder 54 housing a spring 55. The outer end of the spring 55 abuts against a winged nut 57 threaded on a shaft 58. The wings of nut 57 are slidably received by slots 59 in the barrel of the cylinder 54. The shaft 58 passes through an opening 60 in the lower end of the bimetallic timer 47 and extends into a recess 61 in the plunger 38. The rear end of the shaft 58 and the recess 61 in the plunger 38 are non-circular. Hence, they are freely movable axially of each other but rotation of plunger 38 rotates shaft 58 therewith. The shaft 58 has an abutment 62 larger than the opening 60 in the bimetallic timer 47 for a purpose to be explained hereinafter. The lower edge of the auxiliary carriage plate 31 (Fig. 3) engages with a plunger 63 of switch 64 to close the switch 64 when the carriage is moved to downward position.

Figure 5:
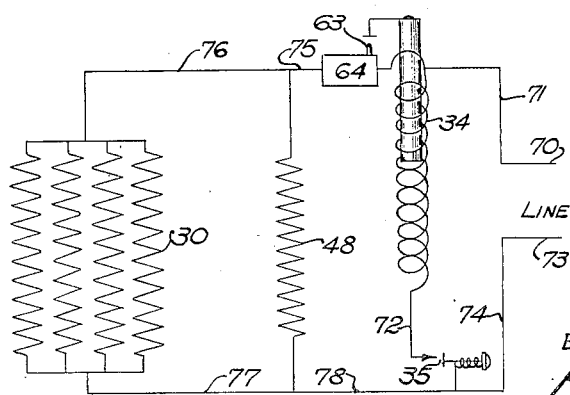
Figure 5 is a wiring diagram showing how the parts are electrically connected.

Referring to Fig. 5, one line wire 70 is connected to one side of the solenoid coils 34 by a conductor 71, and the other ends of coils 34' are connected to one side of switch 35 by a conductor 72. The other side of switch 35 is connected to the other line wire 73 by a conductor 74. The conductor 71 is also connected to one side of the switch 64, the opposite side of which is connected to one side of the auxiliary heater 48 and to one side of the main heaters 30 by conductors 75 and 76. The other sides of the heaters 48 and 30 are connected to the line wire 73 by conductors 77, 78, and 74.

*Operation*

Bread is inserted through the slots 14 so as to rest on the bread carriers 22 and the push button 37 is pressed inwardly to cause the plate 41 to depress the plunger 36 of switch 35 and energize the solenoid coils 34. Energization of the coils 34 will cause the armatures 33 to move downwardly and move the auxiliary carriage plate 31 to downward position against the bias of the spring 44. The lug 65 on carriage plate 31 will then engage the cam 43 of latch lever 66 and move the latch lever 66 counterclockwise against the bias of the spring 68 until the lug 65 moves below the hook 42 of the latch lever 66 whereby the spring 68 will move the hook 42 to a position overlying the lug 65 and latch the auxiliary carriage 31 in downward position.

Downward movement of the auxiliary carriage plate 31 will permit the carriage plate 19 and the bread carriers 22 to move downwardly by gravity so as to position the bread carried by the carriers 22 between the main heaters 30. The lower edge of the auxiliary carriage plate 31 will also depress the plunger 63 of the switch 64 so as to energize both the auxiliary heater 48 and the main heaters 30. The button 37 is then released so as to deenergize the coils 34 and the toasting operation will proceed without further attention from the operator.

Heat from the main heaters 30 will then perform the toasting function and heat from the auxiliary heater 48 will be transmitted to the bimetallic timer 47. The bimetallic timer 47 is so constructed that its free lower end moves to the right when heated as viewed in Fig. 1. The free end of the timer 47 will engage the abutment 62 on the shaft 58, move the shaft 58 to the right, compressing spring 55 and stressing the lower end of the compensating bimetal 53 for movement to the right. Eventually the lower end of the bimetallic timer 47 will contact the end 56 of latch lever 66 and move it counterclockwise as viewed in Fig. 1 so as to remove hook 42 from above the lug 65 on the auxiliary carriage plate 31 to permit spring 44 to pop the auxiliary carriage plate 31, carriage plate 19 and bread carriers 22 upwardly to expose the toasted bread. This action opens switch 64 and deenergizes both the main and auxiliary heaters.

It is to be noted that the compensating bimetal 53 moves toward bimetal 47 upon being heated and resists movement of the latter to its latch releasing position. As the toasting oven 17 heats up this resistance increases, the greatest resistance being imposed just prior to the time the latch 66 is released.

The bimetallic timer 47 being hot at this time it is necessary to quickly cool the same so that a succeeding toasting operation can be begun. Upward movement of the auxiliary carriage plate 31 brings cam 52 into engagement with the cam 51 on the cooling block 49 and moves it into engagement with the bimetallic timer 47 so that the latter is quickly cooled. Movement of the cooling block 49 into contact with the bimetallic timer 47 tends to move the lower end of the bimetallic timer 47 to the left as viewed in Fig. 1 so as to straighten the timer 47 and bring the cooling block 49 into better thermal contact therewith.

Due to the cooling action of the cooling block 49 the bimetallic timer 47 will be quickly cooled and reconditioned for timing a succeeding toasting operation. A second toasting operation may then be initiated simply by inserting new bread through the slots 14 and depressing the button 37.

The cam 52 on the auxiliary carriage plate 31 will be moved from engagement with the cam 51 on the cooling block 49 whereby the spring 50 will move the cooling block 49 away from the bimetallic timer 47 so as to condition the cooling block for a succeeding cooling action and to permit the bimetallic timer 47 to operate as previously described.

The operation will be the same as for the first toasting operation except that the toaster as a whole will have acquired residual heat from the first toasting operation. This residual heat added to that of the main heaters will cook toast faster than when the toaster starts cold. The bimetallic timer 47 will also have acquired residual heat from the previous toasting operation. However, for the heat-up type of bimetallic timer, the timer acquires residual heat faster than the toaster as a whole and thus tends to over-compensate. The bimetallic timer 47 will heat up quicker than for the first toasting operation and, unless prevented, will move to its releasing position sooner. It has been found in practice that bimetallic timers of the heat-up type will operate faster and faster with repeated toasting operations so that if the timer is properly set for toasting a first toasting operation, for succeeding toasting operations, following each other in rapid succession, the timer will act faster and faster so that the toast is progressively underdone for all operations after the first.

In order to prevent the bimetallic timer 47 from acting too fast for toasting operations after the first, the compensating bimetal 53 is provided. As the toaster heats up with repeated use the lower end of the compensating bimetal 53 tends to flex to the left as viewed in Fig. 1 so as to compress the spring 55 to a greater degree. Thus, when the lower end of the timing bimetal 47 contacts the abutment 62 on the shaft 58, it will require a greater force to move the shaft 58 to the right than when the toaster is cold. This will require that the timing bimetal 47 be heated to a higher temperature before it will operate to release the latch 66. However, the temperature of the bimetallic timer 47 at the start of this toasting operation is higher than for the first. As a result, the second toasting operation will be shorter than the first but longer than if the compensating bimetal 53 were not present. The design is such that the action of the compensating bimetal 53 and that of the cooling block 49 lengthens successive toasting intervals sufficiently to offset the tendency of the bimetallic timer 47 to over-compensate.

If the operator desires dark toast the button 37 is rotated to rotate the shaft 58 and by cooperation with nut 57 move the abutment 62 to the left as viewed in Fig. 1 so that the restraining action of the spring 55 will come into play sooner and thus lengthen the toasting intervals. If light or medium toast is desired the button 37 is rotated in the opposite direction to move the abutment 62 farther away from the lower end of bimetallic timer 47 so as to shorten the toasting intervals. This action is represented by the arrows and the letters "D" and "L" on the face of the button or knob 37 as shown in Fig. 4.

If at any time the operator desires to inspect the toast during a toasting interval the dial 25 is rotated clockwise as indicated by the arrow in Fig. 4. This will move the crank arm 27 clockwise and move the link 28 upwardly and raise the carriage plate 19 and bread carriers 22 upwardly so as to project the bread upwardly through the slots 14. This operation will not interfere in any way with the timing of the toasting intervals.

From the foregoing it is obvious that this invention provides a toaster in which the toasting intervals may be predetermined by the operator by operation of the control mechanism which initiates a toasting operation. It is also evident that the compensating bimetal adds resistance to movement of the timing bimetal as the toaster heats up with repeated use so as to prolong the toasting intervals and counteract the tendency of the timing bimetal to over-compensate.

While I have shown but a single embodiment of my invention it is to be understood that this embodiment is to be taken as illustrative only and not in a limiting sense. I do not wish to be limited to the particular structure shown and described but to include all equivalent variations thereof except as limited by the scope of the claims.

I claim:

1. A toaster comprising a bread carrier movable from receiving to toasting position, a thermal timer for timing the duration of successive toasting intervals, heating means for said timer, said timer being of the type which times the duration of toasting intervals by the time it takes to heat said timer to a predetermined temperature, means for moving said carrier to toasting position, means for latching said carrier in toasting position, means actuated by movement of said carrier to toasting position for energizing said heating means, a cooling block normally spring-biased away from heat exchange relationship with said timer, means actuated responsive to the heating of said timer for releasing said carrier for movement to receiving position and means actuated by said movement for moving said cooling block into heat exchange relationship with said timer.

2. A toaster according to claim 1 in which said timer is a bimetallic element with a free end which bows toward said cooling block upon being heated and movement of said cooling block into heat exchange relationship with said timer forcibly straightens said bimetallic element to bring it into better heat exchange relationship with said cooling block.

3. A toaster comprising, a bread carrier movable from receiving to toasting position and spring-biased to receiving position, means for moving said carrier to toasting position, a latch for holding said carrier in toasting position, a thermal timer for timing the duration of succeeding toasting intervals, said timer having a portion movable from a cold position into releasing engagement with said latch when heated, heating means for said timer, means actuated by movement of said carrier to toasting position for energizing said heating means to cause said portion to move into releasing engagement with said latch to release said carrier for movement to receiving position and a cooling block associated with said carrier and actuated by said movement for forcibly moving the movable portion of said timer out of engagement with said latch.

4. A toaster comprising, a bread carrier movable from receiving to toasting position, a thermal timer for timing the duration of successive toasting intervals, means for moving said carrier to toasting position, heating means for heating said thermal timer, means actuated by movement of said carrier to toasting position for energizing said heating means, said thermal timer comprising a bimetallic element having a free end movable from a cold position to a hot position when heated for timing each toasting interval, a compensating bimetal element having a free end positioned in spaced relation to the free end of said timer and acting in opposition thereto and spring means acting between the free ends of said bimetallic elements whereby said spring means resists movement of the free end of said timer to its hot position and said compensating bimetallic element increases the resistive action of said spring means with rises in toaster temperature.

5. A toaster comprising, a supporting frame, main heaters, an auxiliary carriage mounted for vertical reciprocation on said frame, biasing means for biasing said auxiliary carriage to its upward position, power means for moving said auxiliary carriage to its downward position against the bias of said biasing means, means for latching said auxiliary carriage in its downward position, a bread carrier mounted on said auxiliary carriage for downward gravity movement therewith and being movable upwardly independently of said auxiliary carriage when the latter is in its downward position, a thermal timer, said timer being movable in a direction to release said latching means upon being heated, a heater for said timer, means for opposing the releasing action of said timer, a rotatable dial mounted on said frame, linkage means connecting said dial to said carrier and operative to raise the latter independently of said auxiliary carriage upon rotation of said dial, a push button mounted for both rotation and reciprocation centrally of said dial, means actuated by a rotary movement of said push button for varying the opposing action of said opposing means, means actuated by a reciprocal movement of said push button for energizing said power means and means actuated by movement of said auxiliary carriage to its downward position for energizing said heaters.

GEO. A. BRACE.

References Cited in the file of this patent

UNITED STATES PATENTS

| Number | Name | Date |
|---|---|---|
| 1,550,949 | Coleman | Aug. 25, 1925 |
| 2,005,635 | Randolph | June 18, 1935 |
| 2,106,269 | Brosseau et al. | Jan. 25, 1938 |
| 2,167,121 | McCreary et al. | July 25, 1939 |
| 2,196,393 | Ireland | Apr. 9, 1940 |
| 2,254,687 | Koci | Sept. 2, 1941 |
| 2,260,843 | Middleton et al. | Oct. 21, 1941 |
| 2,262,285 | Ireland | Nov. 11, 1941 |
| 2,266,045 | Ireland | Dec. 16, 1941 |
| 2,271,485 | Koci | Jan. 27, 1942 |
| 2,271,520 | Strauss | Feb. 3, 1942 |
| 2,288,699 | Gomersall et al. | July 7, 1942 |
| 2,307,347 | Anderson | Jan. 5, 1943 |
| 2,317,228 | Shroyer | Apr. 20, 1943 |
| 2,361,078 | Anderson | Oct. 24, 1944 |
| 2,362,751 | Huck | Nov. 14, 1944 |
| 2,362,753 | Huck | Nov. 14, 1944 |
| 2,389,434 | Huck | Nov. 20, 1945 |
| 2,440,142 | Elliott | Apr. 20, 1948 |